(12) United States Patent
Kim et al.

(10) Patent No.: US 9,126,862 B2
(45) Date of Patent: Sep. 8, 2015

(54) HEAT-TREATABLE LOW-EMISSIVITY GLASS AND A PRODUCTION METHOD THEREFOR

(75) Inventors: Ung Kil Kim, Seoul (KR); Dae Hoon Kwon, Seoul (KR); Youn Ki Jun, Gwacheon-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/235,886

(22) PCT Filed: Aug. 6, 2012

(86) PCT No.: PCT/KR2012/006228
§ 371 (c)(1),
(2), (4) Date: Jan. 29, 2014

(87) PCT Pub. No.: WO2013/024996
PCT Pub. Date: Feb. 21, 2013

(65) Prior Publication Data
US 2014/0193636 A1 Jul. 10, 2014

(30) Foreign Application Priority Data
Aug. 18, 2011 (KR) .................. 10-2011-0082383

(51) Int. Cl.
*B32B 17/06* (2006.01)
*B32B 15/04* (2006.01)
*C03C 17/36* (2006.01)

(52) U.S. Cl.
CPC ............. *C03C 17/3681* (2013.01); *B32B 15/04* (2013.01); *C03C 17/36* (2013.01); *C03C 17/366* (2013.01); *C03C 17/3618* (2013.01); *C03C 17/3626* (2013.01); *C03C 17/3644* (2013.01); *C03C 17/3652* (2013.01); *Y10T 428/265* (2015.01)

(58) Field of Classification Search
CPC ........ C03C 17/00; C03C 17/06; C03C 17/22; C03C 17/225; C03C 17/23; C03C 17/34; C03C 17/3411; C03C 17/3429; C03C 17/3435; C03C 17/3423; C03C 17/36; C03C 17/3602; C03C 17/3613; C03C 17/361; C03C 17/3626; C03C 17/3639; C03C 17/3642; C03C 17/3644; C03C 17/3652; C03C 17/366; C03C 17/3681; C03C 2218/156; B32B 15/00; B32B 15/04; B32B 17/00; B32B 17/06; B32B 17/061; B32B 2250/05
USPC ......... 428/426, 428, 432, 433, 434, 688, 689, 428/697, 699, 701, 702, 698; 427/402
See application file for complete search history.

(56) References Cited

U.S. PATENT DOCUMENTS

| | | | |
|---|---|---|---|
| 6,432,545 B1 * | 8/2002 | Schicht et al. | 428/432 |
| 6,942,923 B2 * | 9/2005 | Stachowiak | 428/428 |
| 2002/0064662 A1 * | 5/2002 | Lingle et al. | 428/432 |
| 2003/0104221 A1 * | 6/2003 | Stachowiak | 428/432 |
| 2003/0194488 A1 * | 10/2003 | Stachowiak | 427/162 |
| 2004/0086723 A1 * | 5/2004 | Thomsen et al. | 428/426 |
| 2005/0042459 A1 * | 2/2005 | Kriltz et al. | 428/432 |
| 2005/0186482 A1 * | 8/2005 | Maschwitz | 430/1 |
| 2005/0258030 A1 * | 11/2005 | Finley et al. | 204/192.26 |
| 2006/0054492 A1 * | 3/2006 | Stachowiak | 204/192.2 |
| 2008/0011408 A1 * | 1/2008 | Maschwitz | 156/99 |
| 2008/0138547 A1 * | 6/2008 | Maschwitz | 428/34 |
| 2008/0311389 A1 | 12/2008 | Roquiny et al. | |
| 2009/0181245 A1 * | 7/2009 | Maschwitz | 428/336 |
| 2010/0167034 A1 * | 7/2010 | Depauw et al. | 428/216 |
| 2010/0221575 A1 * | 9/2010 | Stull | 428/680 |
| 2011/0027562 A1 * | 2/2011 | Di Stefano | 428/216 |
| 2011/0070417 A1 * | 3/2011 | Reutler et al. | 428/213 |
| 2011/0135955 A1 * | 6/2011 | Maschwitz et al. | 428/623 |
| 2011/0261442 A1 * | 10/2011 | Knoll et al. | 359/360 |

FOREIGN PATENT DOCUMENTS

| | | |
|---|---|---|
| EP | 1889818 A1 | 2/2008 |
| JP | 2000233947 A | 8/2000 |
| JP | 2007524132 A | 8/2007 |
| JP | 2007534603 A | 11/2007 |
| JP | 2008540320 A | 11/2008 |
| KR | 1019970000383 B1 | 1/1997 |

| | | | |
|---|---|---|---|
| KR | 1020030076569 A | 9/2003 | |
| KR | 1020070022009 A | 2/2007 | |
| KR | 20100021355 A | 2/2010 | |
| KR | 1020110084979 A | 7/2011 | |
| WO | 2010129730 A1 | 11/2010 | |

OTHER PUBLICATIONS

International Search Report for PCT/KR2012/006228 mailed on Feb. 7, 2013.
Japanese Office Action dated Feb. 27, 2015.
European extended search report dated Apr. 9, 2015 from EPO, citing the above reference(s).

* cited by examiner

*Primary Examiner* — David Sample
*Assistant Examiner* — Lauren Colgan
(74) *Attorney, Agent, or Firm* — Lowe Hauptman & Ham, LLP

(57) ABSTRACT

A low-emissivity glass which is outstandingly durable and is heat treatable without any changes in its characteristics before and after the heat treatment; and a production method therefor. The heat-treatable low-emissivity glass according to the present invention is characterized in that it comprises: a sunlight-adjusting metal layer which is formed above a glass substrate; a first dielectric layer which is formed below the sunlight-adjusting metal layer; a second dielectric layer which is formed above the sunlight-adjusting metal layer; and an uppermost protective layer which is formed above the second dielectric layer, and in that the first dielectric layer has a structure obtained by the lamination of a lowermost dielectric layer comprising a metal oxide and a lower metal protective dielectric layer comprising a metal (oxy)nitride, and an advantage of the present invention is that there is no change in the characteristics of the low-emissivity glass even after heat treatment.

9 Claims, 2 Drawing Sheets

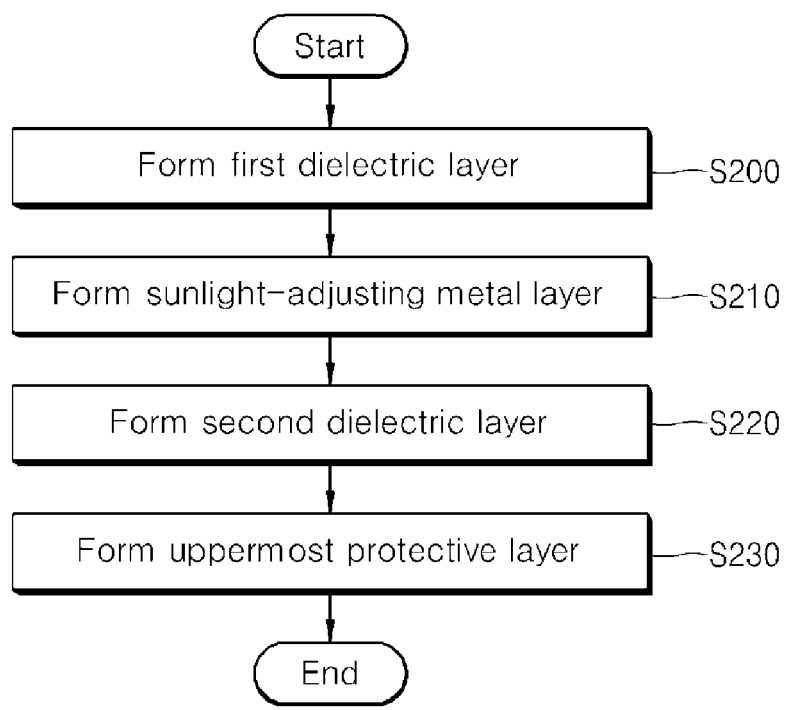

HEAT-TREATABLE LOW-EMISSIVITY GLASS AND A PRODUCTION METHOD THEREFOR

CROSS REFERENCE TO RELATED APPLICATION

This application claims the priority of Korean Patent Application No. 10-2011-0082383 filed on Aug. 18, 2011 in the Korean Patent and Trademark Office. Further, this application is the National Phase application of International Application No. PCT/KR2012/006228 filed on Aug. 6, 2012, which is incorporated herein by reference in its entirety.

TECHNICAL FIELD

The present invention relates to a low-emissivity glass and a production method thereof, and more particularly, to a low-emissivity glass which is heat-treatable and has excellent durability, and a production method thereof

BACKGROUND ART

Low-emissivity glass refers to glass onto which a low-emissivity layer containing a metal having high reflectivity in an infrared region, such as silver (Ag), is deposited as a thin film. Such a low-emissivity glass is a functional material that reflects solar radiation in summer and conserves infrared light generated from an indoor heater in winter, thereby providing an energy-saving effect of buildings. Techniques related to low-emissivity glass are disclosed in various documents including Korean Patent Laid-open Publication No. 10-2010-0021355 and the like.

In general, silver (Ag) used for a low-emissivity layer is highly susceptible to oxidation, and thus, dielectric layers are deposited as antioxidant layers on top and bottom surfaces of the low-emissivity layer. In addition, such dielectric layers serve to increase transmittance of visible light.

A typical dielectric layer includes a metal oxide, for example, oxides of zinc (Zn), titanium (Ti), tin (Sn), and the like, or a complex metal (SnZn) of zinc and tin. However, the metal oxide for the dielectric layer is likely to cause interfacial reaction between the oxide and an adjacent metal layer after heat treatment, whereby transmittance of visible light can be easily varied before and after heat treatment.

DISCLOSURE

Technical Problem

An aspect of the present invention is to provide a low-emissivity glass, which does not suffer from variance in emissivity before and after heat treatment, and a method of producing the same.

Technical Solution

In accordance with one aspect of the present invention, a low-emissivity glass includes: a sunlight-adjusting metal layer formed on a glass substrate; a first dielectric layer formed under the sunlight-adjusting metal layer; a second dielectric layer formed on the sunlight-adjusting metal layer; and an uppermost protective layer formed on the second dielectric layer, wherein the first dielectric layer has a structure in which a lowermost dielectric layer containing a metal oxide and a lower metal protective dielectric layer containing a metal (oxy)nitride are stacked.

In accordance with another aspect of the present invention, a method of producing a low-emissivity glass includes: (a) forming a first dielectric layer by depositing a metal oxide on a glass substrate and depositing a metal (oxy) nitride on the deposited metal oxide; (b) forming a sunlight-adjusting metal layer on the first dielectric layer; (c) forming a second dielectric layer by depositing a metal (oxy)nitride on the sunlight-adjusting metal layer; and (d) forming an uppermost protective layer by depositing a metal oxide on the second dielectric layer.

Advantageous Effects

In the low-emissivity glass according to the present invention, the first dielectric layer formed on the glass substrate has a structure in which the lowermost dielectric layer containing a metal oxide and the lower metal protective dielectric layer containing a metal (oxy)nitride are stacked, whereby the metal (oxy)nitride can advantageously protect the sunlight-adjusting metal layer from oxygen of the oxide.

With such structural characteristics, the low-emissivity glass according to the present invention has excellent transmittance of visible light and does not suffer from variation in emissivity even after heat treatment.

DESCRIPTION OF DRAWINGS

FIG. 2 is a flowchart of a method of producing a low-emissivity glass according to one embodiment of the present invention.

BEST MODE

Figure 1:
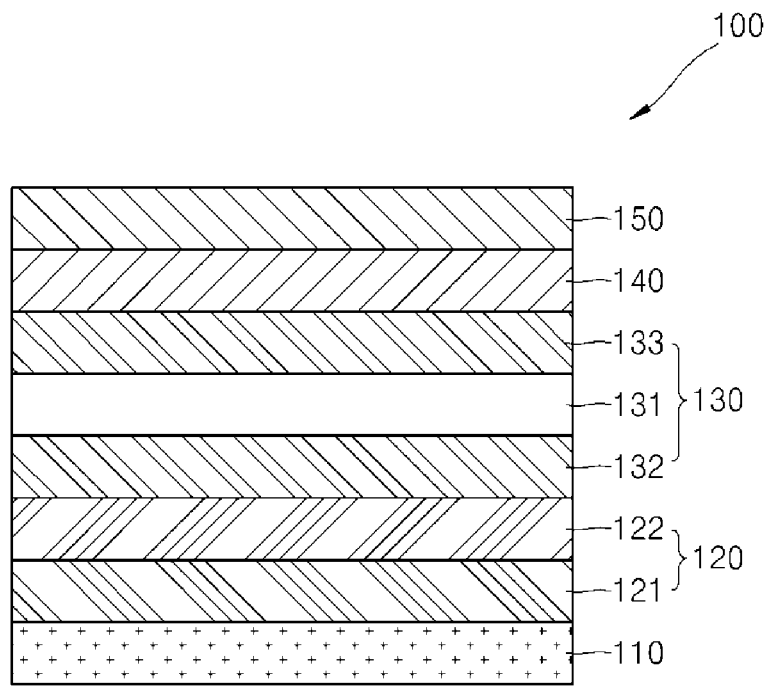
FIG. 1 is a cross-sectional view of a low-emissivity glass according to one embodiment of the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like components will be denoted by like reference numerals throughout the specification.

Hereinafter, a low-emissivity glass and a method of producing the same according to embodiments of the invention will be described in more detail with reference to the accompanying drawings.

FIG. 1 is a cross-sectional view of a low-emissivity glass according to one embodiment of the present invention.

Referring to FIG. 1, a low-emissivity glass 100 includes a glass substrate 110, a first dielectric layer 120, a sunlight-adjusting metal layer 130, a second dielectric layer 140 and an uppermost protective layer 150.

Hereinafter, when a certain element is referred to as being formed "at an upper (or lower) portion" of, or being formed "on (or under)" another element, the certain element may be directly placed on an upper surface (lower surface) of the other element, or an intervening layer(s) may be present therebetween.

The glass substrate 110 may include a typical soda-lime glass for buildings. In this embodiment, the glass substrate 110 having a thickness of 2 mm to 12 mm may be used in accordance with purpose.

According to this embodiment, the low-emissivity glass 100 includes the first dielectric layer 120 formed on the glass substrate 110. The first dielectric layer protects the sunlight-adjusting metal layer from oxygen or ions upon heat treatment of the low-emissivity glass 100.

According to this embodiment, the first dielectric layer 120 has a structure in which a lowermost dielectric layer 121 containing a metal oxide and a lower metal protective dielectric layer 122 containing a metal (oxy)nitride are stacked. Here, the lower metal protective dielectric layer 122 containing the metal (oxy)nitride means that the lower metal protective dielectric layer 122 contains a metal nitride or a metal oxynitride. That is, the first dielectric layer 120 has a two-layer structure in which the lowermost dielectric layer 121 is formed on the glass substrate 110 and the lower metal protective dielectric layer 122 is stacked thereon.

The lower metal protective dielectric layer 122 containing the metal (oxy)nitride serves to prevent interfacial reaction between the lowermost dielectric layer 121 containing the metal oxide and the sunlight-adjusting metal layer 130 upon heat treatment of the low-emissivity glass, and to protect the sunlight-adjusting metal layer 130. With this structure, the low-emissivity glass 100 according to the present invention undergoes substantially no change in characteristics such as transmittance of visible light even after heat treatment, and particularly, does not have any change in emissivity.

In the first dielectric layer 120, the metal (oxy)nitride and the metal oxide may include the same metal. The first dielectric layer 120 may have a structure in which the metal (oxy)nitride and the metal oxide including the same metal are stacked, whereby deposition between materials constituting the lowermost dielectric layer 121 and the lower metal protective dielectric layer 122 can be activated, thereby simplifying a production process of the low-emissivity glass while reducing production costs.

For example, the first dielectric layer 120 may include an oxide and (oxy)nitride of Zn, which contains Sn. That is, the first dielectric layer 120 may have a lamination structure of $SnZnO_x/SnZnO_xN_y$ or $SnZnO_x/SnZnN_x$. There is no limit as to a compositional range of the oxide and the (oxy)nitride, and the compositional range may vary depending on the content of ambient gas upon coating.

The lowermost dielectric layer 121 may have a thickness of 10 nm to 50 nm. If the thickness of the lowermost dielectric layer 121 is less than 10 nm, a coating film has low durability. If the thickness of the lowermost dielectric layer 121 is greater than 50 nm, the low-emissivity glass can be deteriorated in optical characteristics.

In addition, the lower metal protective dielectric layer 122 may have a thickness of 1 nm to 10 nm. If the thickness of the lower metal protective dielectric layer 122 is less than 1 nm, the lower metal protective dielectric layer 122 cannot serve as a layer for protecting the sunlight-adjusting metal layer 130 upon heat treatment. If the thickness of the lower metal protective dielectric layer 122 is greater than 10 nm, the low-emissivity glass can be deteriorated in optical characteristics.

In the low-emissivity glass according to the present invention, the sunlight-adjusting metal layer 130 is formed on the first dielectric layer 120. The sunlight-adjusting metal layer 130 may include a low-emissivity layer 131 and metal protective layers 132, 133 formed on and under the low-emissivity layer 131.

The low-emissivity layer 131 selectively transmits and reflects solar radiation. In the low-emissivity glass according to the present invention, the low-emissivity layer 131 may include at least one material selected from the group consisting of silver, gold, copper, aluminum and platinum, and may include, for example, silver. When the low-emissivity layer 131 is formed of silver, the low-emissivity glass can satisfy high electric conductivity, low absorptivity in a visible-light range, high durability, etc.

The metal protective layers 132, 133 are formed on and under the low-emissivity layer 131. The metal protective layers 132, 133 serve as barriers to interrupt sodium from spreading on the glass substrate and oxygen from entering from air upon heat treatment of the low-emissivity glass, and serve to assist in fusion of the low-emissivity layer 131, whereby the low-emissivity layer 131 can be stable at high temperature upon heat treatment. In addition, the metal protective layers 132, 133 function to absorb oxygen infiltrated into the low-emissivity layer 131. The metal protective layers 132, 133 may include nickel, chrome, or alloys of nickel and chrome.

Further, in the low-emissivity glass according to the present invention, the second dielectric layer 140 is formed on the sunlight-adjusting metal layer 130. The second dielectric layer 140 performs the same function as the first dielectric layer 120. That is, the second dielectric layer 140 protects the sunlight-adjusting metal layer 130 from oxygen or ions upon heat treatment of the low-emissivity glass, like the first dielectric layer 120.

There is no limit to materials for the second dielectric layer 140. The second dielectric layer may include a metal oxide or (oxy)nitride containing at least one element selected from the group consisting of Al, B, Ti, Nb, Sn and Mo. In particular, the second dielectric layer 120 may include a metal nitride of zinc, which contains Sn, and may include, for example, $SnZnO_xN_y$ or $SnZnN_x$. There is no limit to a compositional range of the metal nitride, and the compositional range may vary depending on the content of ambient gas upon coating.

In addition, the low-emissivity glass according to the present invention includes the uppermost protective layer 150 formed on the second dielectric layer 140. The uppermost protective layer 150 also performs the same function as the first dielectric layer 120 and the second dielectric layer 140. There is no limit to materials for the uppermost protective layer 150. The uppermost protective layer 150 may include a metal oxide containing at least one element selected from the group consisting of Al, B, Ti, Nb, Sn and Mo. In particular, the uppermost protective layer 150 may include a metal oxide of Zn, which contains Sn, and may include, for example, $SnZnO_x$.

FIG. 2 is a schematic flowchart of a method of preparing a low-emissivity glass according to one embodiment of the present invention. Referring to FIG. 2, the method includes (a) forming a first dielectric layer 120 (S200), (b) forming a sunlight-adjusting metal layer 130 (S210), (c) forming a second dielectric layer 140 (S220), and (d) forming an uppermost protective layer 150 (S230).

In operation (a), the first dielectric layer 120 is formed on a glass substrate 110. To form the first dielectric layer 120, a metal oxide is first deposited on the glass substrate 110, followed by depositing a metal (oxy)nitride on the deposited metal oxide, thereby forming the first dielectric layer 120.

The metal oxide may include $SnZnO_x$. The $SnZnO_x$ layer may be deposited on the glass substrate 110 under an atmosphere of oxygen and argon. In addition, the metal (oxy)nitride may include $SnZnO_xN_y$ or $SnZ_nN_x$. The metal nitride layer, i.e. $SnZnN_x$, may be deposited on the metal oxide layer under an atmosphere of nitrogen and argon. The metal (oxy)nitride layer, i.e. $SnZnO_xN_y$, may be deposited under an atmosphere of nitrogen, oxygen and argon.

There is no limit to the process of depositing the first dielectric layer 120. For example, magnetron sputtering may be used.

Next, in operation (b), the sunlight-adjusting metal layer 130 is formed on the first dielectric layer 120. The sunlight-adjusting metal layer 130 may include a low-emissivity layer 131 and metal protective layers 132, 133 respectively formed on and under the low-emissivity layer. That is, the sunlight-adjusting metal layer 130 may be formed by depositing the metal protective layer 132 on the first dielectric layer 120, depositing the low-emissivity layer 131 on the metal protective layer 132, and depositing the metal protective layer 133 on the low-emissivity layer 131.

Likewise, there is no limit to the process of depositing the metal protective layers 132, 133 and the low-emissivity layer 131. For example, magnetron sputtering may be used.

Next, in operation (c), the second dielectric layer 140 is formed on the sunlight-adjusting metal layer 130, and in operation (d), the uppermost protective layer 150 is formed on the second dielectric layer 140.

The second dielectric layer 140 is formed by depositing a metal (oxy)nitride, for example, $SnZnO_yN_x$ or $SnZnN_x$, on the sunlight-adjusting metal layer 130. Further, the uppermost protective layer 150 is formed by depositing a metal oxide, for example, $SnZnO_x$, on the second dielectric layer 140.

Through the foregoing method, it is possible to produce a low-emissivity glass according to one embodiment of the present invention.

EXAMPLES

Next, the present invention will be explained in more detail with reference to some examples. However, it should be understood that these examples are provided for illustration only and are not to be in any way construed as limiting the present invention.

Example 1

Using magnetron (C-Mag) sputtering, a low-emissivity glass including a coating layer having a composition and thickness as shown in Table 1 was produced.

A $SnZnO_x$ layer was deposited to a thickness of 21 nm on a 6 mm thick transparent glass substrate under an oxygen/argon atmosphere (50% oxygen and 50% argon). Then, a $SnZnN_x$ layer was deposited to a thickness of 4 nm under an oxygen/argon atmosphere (50% nitrogen and 50% argon), thereby forming a first dielectric layer. NiCr, Ag and NiCr layers were sequentially deposited on the first dielectric layer under a 100% argon atmosphere to form a sunlight-adjusting metal layer, followed by deposition of a $SnZnN_x$ layer under the same condition as the $SnZnN_x$ layer to form a second dielectric layer. Finally, a $SnZnO_x$ layer was further deposited under the same conditions as the $SnZnO_x$ layer, thereby producing a low-emissivity glass of Example 1.

Examples 2 to 4

Low-emissivity glasses were produced under the same conditions as in Example 1 except for the thickness of $SnZnN_x$.

Example 5

A low-emissivity glass was produced under the same conditions as in Example 1, except that $SnZnO_yN_x$ layers were formed instead of $SnZnN_x$. The $SnZnO_yN_x$ layer was deposited to a thickness of 2 nm under a nitrogen/oxygen/argon atmosphere (48.5% nitrogen, 3% oxygen, and 48.5% argon).

Comparative Example 1

A low-emissivity glass was produced under the same conditions as in Example 1, except that the $SnZnN_x$ layer corresponding to the metal protective layer and the second dielectric layer was excluded.

TABLE 1

| | Structure | Composition | Thickness |
|---|---|---|---|
| Example 1 | uppermost protective layer | $SnZnO_x$ | 49 nm |
| | second dielectric layer | $SnZnN_x$ | 4 nm |
| | metal protective layer | NiCr | 4.5 nm |
| | low-emissive layer | Ag | 11 nm |
| | metal protective layer | NiCr | 3 nm |
| | lower metal protective dielectric layer | $SnZnN_x$ | 4 nm |
| | lowest dielectric layer | $SnZnO_x$ | 21 nm |
| | substrate | glass | 6 mm |
| Example 2 | uppermost protective layer | $SnZnO_x$ | 49 nm |
| | second dielectric layer | $SnZnN_x$ | 2 nm |
| | metal protective layer | NiCr | 4.5 nm |
| | low-emissive layer | Ag | 11 nm |
| | metal protective layer | NiCr | 3 nm |
| | lower metal protective dielectric layer | $SnZnN_x$ | 2 nm |
| | lowest dielectric layer | $SnZnO_x$ | 21 nm |
| | substrate | glass | 6 mm |
| Example 3 | uppermost protective layer | $SnZnO_x$ | 49 nm |
| | second dielectric layer | $SnZnN_x$ | 1.5 nm |
| | metal protective layer | NiCr | 4.5 nm |
| | low-emissive layer | Ag | 11 nm |
| | metal protective layer | NiCr | 3 nm |
| | lower metal protective dielectric layer | $SnZnN_x$ | 1.5 nm |
| | lowest dielectric layer | $SnZnO_x$ | 21 nm |
| | substrate | glass | 6 mm |
| Example 4 | uppermost protective layer | $SnZnO_x$ | 49 nm |
| | second dielectric layer | $SnZnN_x$ | 1 nm |
| | metal protective layer | NiCr | 4.5 nm |
| | low-emissive layer | Ag | 11 nm |
| | metal protective layer | NiCr | 3 nm |
| | lower metal protective dielectric layer | $SnZnN_x$ | 1 nm |
| | lowest dielectric layer | $SnZnO_x$ | 21 nm |
| | substrate | glass | 6 mm |
| Example 5 | uppermost protective layer | $SnZnO_x$ | 49 nm |
| | second dielectric layer | $SnZnO_yN_x$ | 2 nm |
| | metal protective layer | NiCr | 4.5 nm |
| | low-emissive layer | Ag | 11 nm |
| | metal protective layer | NiCr | 3 nm |
| | lower metal protective dielectric layer | $SnZnO_yN_x$ | 2 nm |
| | lowest dielectric layer | $SnZnO_x$ | 21 nm |
| | substrate | glass | 6 mm |
| Comparative Example 1 | second dielectric layer | $SnZnO_x$ | 49 nm |
| | metal protective layer | NiCr | 4.5 nm |
| | low-emissive layer | Ag | 11 nm |
| | metal protective layer | NiCr | 3 nm |
| | first dielectric layer | $SnZnO_x$ | 21 nm |
| | substrate | glass | 6 mm |

Experimental Example

The samples of the low-emissivity glass produced in Examples and Comparative Example were subjected to heat treatment. Heat treatment was performed using a rapid thermal annealing system (RTS) for laboratories. The samples of Examples and Comparative Examples were put into the RTS, and subjected to heat treatment under conditions that an inner temperature of the RTS was increased up to about 670° C. for 5 minutes, maintained for 5 minutes, and decreased to room temperature.

The samples of Examples and Comparative Example were evaluated as to transmittance of visible light and haze using a Haze-Gard Plus device before and after heat treatment. Further, emissivity of the samples of Examples and Comparative Example was measured using an emissiometer MK3. Property variation measured before and after heat treatment is shown in Table 2.

TABLE 2

| | Variation in transmittance of visible light (%) | Variation in haze (Haze) | Variation in emissivity (%) |
|---|---|---|---|
| Example 1 | 1.8 | 0.13 | 0 |
| Example 2 | 5.6 | 0.72 | 0 |
| Example 3 | 3.6 | 0.16 | 0 |
| Example 4 | 6.8 | 0.09 | 0 |
| Example 5 | 2.2 | 0.21 | 0 |
| Comparative Example 1 | 14.6 | 1.05 | 1 |

Referring to Table 2, Examples 1 to 5 exhibited substantially no change in emissivity as compared with Comparative Example 1. Conversely, Comparative Example 1 had a change of 1% in emissivity before and after heat treatment. In addition, Examples 1 to 5 exhibited a remarkably small change in transmittance of visible ligth and haze as compared with Comparative Example 1. That is, unlike Comparative Example, the low-emissivity glass samples according to the inventive examples exhibited little change in the propreties thereof even after heat treatment since the deposited SnZnNx or SnZnOxNy layer served as a layer for protecting the sunlight-adjusting metal layer.

Although some embodiments have been described herein, it should be understood by those skilled in the art that these embodiments are given by way of illustration only, and that various modifications, variations, and alterations can be made without departing from the spirit and scope of the present invention. Therefore, the scope of the present invention should be limited only by the accompanying claims and equivalents thereof.

The invention claimed is:

1. A low-emissivity glass, comprising:
a sunlight-adjusting metal layer disposed on a glass substrate;
a first dielectric layer disposed under the sunlight-adjusting metal layer;
a second dielectric layer disposed on the sunlight-adjusting metal layer; and
an uppermost protective layer disposed on the second dielectric layer,
the first dielectric layer comprising a structure in which a lowermost dielectric layer containing a metal oxide and a lower metal protective dielectric layer containing a metal (oxy)nitride are stacked,
wherein the second dielectric layer comprises $SnZnO_xN_y$,
wherein the uppermost protective layer comprises $SnZnO_x$,
wherein the lowermost dielectric layer and the lower metal protective dielectric layer comprise the same metal,
wherein the lowermost dielectric layer comprises $SnZnO_x$, and
wherein the lower metal protective dielectric layer comprises $SnZnO_xN_y$.

2. The low-emissivity glass according to claim 1, wherein the lowermost dielectric layer has a thickness of 10 nm to 50 nm.

3. The low-emissivity glass according to claim 1, wherein the lower metal protective dielectric layer has a thickness of 1 nm to 10 nm.

4. The low-emissivity glass according to claim 1, wherein the sunlight-adjusting metal layer comprises a low-emissivity layer and metal protective layers disposed on and under the low-emissivity layer.

5. The low-emissivity glass according to claim 4, wherein the low-emissivity layer comprises at least one material selected from the group consisting of silver, gold, copper, aluminum and platinum.

6. The low-emissivity glass according to claim 4, wherein the metal protective layers comprise at least one material selected from the group consisting of nickel, chrome, and an alloy of nickel and chrome.

7. The low-emissivity glass according to claim 4, wherein the low-emissivity layer comprises aluminum.

8. The low-emissivity glass according to claim 4, wherein the low-emissivity layer comprises platinum.

9. A low-emissivity glass, comprising:
a glass substrate;
a lowermost dielectric layer directly disposed on the glass substrate, wherein the lowermost dielectric layer comprises $SnZnO_x$;
a lower metal protective dielectric layer directly disposed on the lowermost dielectric layer, wherein the lower metal protective dielectric layer comprises $SnZnO_xN_y$ and;
a first metal protective layer directly disposed on the lower metal protective dielectric layer;
a low-emissivity layer directly disposed on the first metal protective layer;
a second metal protective layer directly disposed on the low-emissivity layer;
an upper dielectric layer directly disposed on the second metal protective layer, wherein the upper dielectric layer comprises $SnZnO_xN_y$ and; and
an uppermost protective layer directly disposed on the upper dielectric layer, wherein the uppermost protective layer comprises $SnZnO_x$.

* * * * *